D. LADD.
Corn-Planter.
No. 22,183.
Patented Nov. 30. 1858.
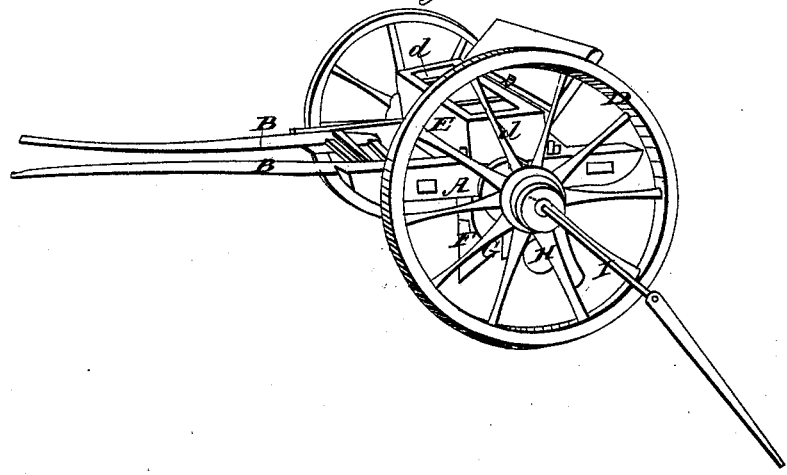
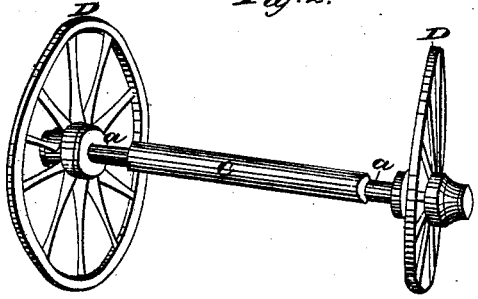

UNITED STATES PATENT OFFICE.

D. LADD, OF DEARBORN, MICHIGAN.

IMPROVEMENT IN CORN-PLANTERS.

Specification forming part of Letters Patent No. 22,183, dated November 30, 1858.

*To all whom it may concern:*

Be it known that I, DANIEL LADD, of Dearborn, county of Wayne, State of Michigan, have invented a new and Improved Mode of Planting Corn and other Seeds; and I do hereby declare that the following is a full and exact description thereof, reference being had to the accompanying drawings and the letters of reference marked thereon.

The nature of my invention consists in planting corn and other seeds by means of a suitable frame mounted on wheels to be drawn by a horse, and so constructed that by the rotating of the axle the seed is deposited at equal distances in furrows made by small plows attached to the under side of the frame. The seed passing from a box (containing hoppers at each end which is supported on the frame) is deposited in the furrows through tubes reaching nearly to the ground in rear of the plow, and is covered by scrapers attached to the frame in rear of the tubes.

Figure 1 is a perspective view of this machine, in which A is the frame; B, the shafts, that are attached permanently to frame A; C, axle on which frame A is supported; D D, wheels, which also serve to support the frame; E, box on the frame, containing the seed to be planted. In each end of this box hoppers are formed, with openings in their bottoms to allow the seed to pass through. This box is placed over the axle and reaching nearly to the wheels. The openings in the hoppers are placed over and communicating with corresponding cavities in the axle; F F, small plows attached to the lower side of frame A for the purpose of forming furrows in the ground in which to deposit the seed to be planted; G G, tubes for conveying seed from the hoppers to the ground; H H, scrapers, also attached to the under side of frame A, in rear of tubes G G, for the purpose of covering the seed after it has been deposited.

Fig. 2 shows the wheels and axle, with cavities *a a* for receiving the seed from the hoppers. I (see Fig. 1) is a rod attached to the axle outside of the wheels, and having a rod or chain attached to its outer end for the purpose of marking, to enable the person operating the machine to preserve a corresponding distance betwe the rows.

In operating this machine the seed is placed in hoppers *d d*. When the machine is moved forward the axle is made to rotate by making the wheels fast to it; and as the cavities in the axle are brought in conjunction with the openings in the hopper the cavity in the axle will receive the required number of kernels, and by the rotation of the axle the seed falls through tubes G G to the ground and is covered by scrapers H H.

When the cover of box E is shut down it forms a seat for the person operating the machine.

This machine is capable of planting twenty-five acres of corn per day.

I do not claim as my invention any of the before-mentioned parts of this machine separately; but What I do claim, and desire to secure by Letters Patent, is—

The peculiar arrangement of the frame A, shafts B B, axle C, with cavities *a a*, wheels D D, box E, plows F F, tubes G G, scrapers H H, and rod I, attached to axle C, when made and used identically as described, and for the purposes herein set forth.

DANIEL LADD.

Witnesses:
A. A. WILDER,
A. G. FULLER.